United States Patent [19]

Matsumura et al.

[11] Patent Number: 5,874,041
[45] Date of Patent: Feb. 23, 1999

[54] PHOTO-CURABLE RESIN COMPOSITION AND PROCESS FOR PREPARING RESIN-BASED MOLD

[75] Inventors: Ayao Matsumura, Mie; Yuichi Haruta, Ibaraki; Tsuyoshi Watanabe, Ibaraki; Takashi Ukachi, Ibaraki, all of Japan

[73] Assignees: DSM N.V., Heerlen, Netherlands; JSR Corp.; Japan Fine Coatings Co., Ltd., both of Tokyo, Japan

[21] Appl. No.: 865,781

[22] Filed: May 30, 1997

[30] Foreign Application Priority Data

May 30, 1996 [JP] Japan .................................. 8-137027

[51] Int. Cl.$^6$ ............................ B29C 35/08; B29C 41/02
[52] U.S. Cl. ............................................ 264/401; 264/308
[58] Field of Search ...................... 264/308, 401

[56] References Cited

U.S. PATENT DOCUMENTS

| | | | |
|---|---|---|---|
| 4,575,330 | 3/1986 | Hull | 425/174.4 |
| 4,942,066 | 7/1990 | Fan | 427/553 |
| 5,002,855 | 3/1991 | Fan | 430/270.1 |
| 5,175,077 | 12/1992 | Grossa | 264/401 |
| 5,496,870 | 3/1996 | Chawla et al. | 522/90 |

FOREIGN PATENT DOCUMENTS

| | | |
|---|---|---|
| 60-247515 | 12/1985 | Japan . |
| 62-35966 | 2/1987 | Japan . |
| 62-101408 | 5/1987 | Japan . |
| 5-24119 | 2/1993 | Japan . |
| 7-205157 | 8/1995 | Japan . |

OTHER PUBLICATIONS

Derwent Abstract 008048476, JP 1232025, Sep. 1989.
Derwent Abstract 010200745, JP 7026062, Jan. 1995.
Derwent Abstract 010200743, JP 7026060, Jan. 1995.

*Primary Examiner*—Leo B. Tentoni
*Attorney, Agent, or Firm*—Pillsbury Madison & Sutro

[57] ABSTRACT

A photo-curable resin composition suitable as a material for optical molding. The composition can produce cured products with excellent mechanical strength and high heat resistance. Further disclosed is a process for molding a resin-based mold which provides superior molding dimensional precision and superb repetition durability. The composition contains a monomer component which contains (A) 20–80 wt % of a urethane-bond polyfunctional (meth)acrylate having a number average molecular weight of 1,000 or less and (B) 80–20 wt % of an ethylenically unsaturated monomer containing a cyclic structure and at least one ethylenically unsaturated bond in the molecule and of which the homopolymer has a glass transition temperature of 50° C. or higher; (C) a photopolymerization initiator; and (D) an inorganic filler having an average particle diameter or an average fiber length of 1–50 μm, wherein the ratio of the inorganic filler for 100 parts by volume of said monomer components and the photopolymerization initiator is 100–160 parts by volume, and the heat distortion temperature of the cured resin produced from the photo-curable resin composition is 80° C. or higher.

24 Claims, 1 Drawing Sheet

PHOTO-CURABLE RESIN COMPOSITION AND PROCESS FOR PREPARING RESIN-BASED MOLD

BACKGROUND OF THE INVENTION

1. Field of the Invention

The present invention relates to a photo-curable resin composition and a process for preparing a resin mold by optically molding this photo-curable resin composition.

2. Background Information

In recent years, optical molding processes for forming three-dimensional objects consisting of integrally laminated cured resin layers prepared by repeating a step of forming a cured resin layer by selectively irradiating a photo-curable material with light have been proposed (see Japanese Patent Application Laid-open No. 247515/1985, U.S. Pat. No. 4,575,330 (Japanese Patent Application Laid-open No. 35966/1987), Japanese Patent Application Laid-open No. 101408/1987, Japanese Patent Application Laid-open No. 24119/1993). These optical molding processes are attracting attention due to their capability of easily forming the target three-dimensional object in a short period of time even when the shape of the object is complicated.

A typical example of such an optical molding process comprises forming a thin layer of a liquid photo-curable resin composition, selectively irradiating this thin layer with light using, for example, an ultraviolet radiation laser to obtain a cured resin layer, feeding the photo-curable resin composition to form another thin layer of the composition over this cured resin layer, and selectively irradiating this thin layer with light to form a new cured resin layer which is integrally laminated over the previously formed cured resin layer. This step is repeated a number of times, with or without changing the pattern in which the light is irradiated to form a three-dimensional object consisting of integrally laminated multiple cured resin layers.

The characteristics demanded of the photo-curable resin composition used for these optical molding processes include a low viscosity, capability of being rapidly cured by irradiation of light, non-swelling characteristics of the cured products when contacted by a photo-curable resin composition, minimal distortion due to shrinkage during curing with light, such as production of warped parts, indented parts, or stretched parts (overhanging parts).

Three-dimensional objects prepared by optical molding methods have conventionally been used for a design model, a model for medical services, and a master model for a resin molding die. In recent years, attempts have been made to mount parts such as a connector or a plug, and to incorporate parts for test purposes such as a heater, a motor, or an engine, directly manufactured by optical molding methods. In addition to high dimensional accuracy, mechanical strength and heat resistance sufficient to withstand conditions of use are demanded of these parts. However, the conventional optical molding method using a photo-curable resin composition cannot produce cured products with sufficient mechanical strength and heat resistance. It has therefore been difficult to manufacture three-dimensional objects for mounting parts and incorporating parts having good mechanical strength and heat resistance which can withstand actual conditions of use.

On the other hand, there has been an attempt to manufacture a mold used for various molding methods such as the injection molding method, press molding method, vacuum molding method, high-pressure molding method, or foaming molding method by an optical molding method (such a mold made from a resin composition is hereinafter called a resin-based mold).

However, no conventional optical molding method using known photo-curable resin compositions can produce optical molding objects possessing sufficient pressure resistance and heat resistance as demanded of such a resin-based mold. It is therefore difficult to manufacture the resin-based mold having excellent repetition durability by an optical molding method.

The present invention has been achieved in view of this situation and has an object of providing a photo-curable resin composition which can produce cured products with excellent mechanical strength and heat resistance by an optical molding method. Another object of the present invention is to provide a process for manufacturing a resin-based mold which has high dimensional accuracy and exhibits its superior repetition durability.

SUMMARY OF THE INVENTION

The above first object can be attained in the present invention by a resin composition for optical molding comprising, a monomer component which comprises, (A) 20–80 wt % of a urethane-bond-containing polyfunctional (meth)acrylate having a number average molecular weight of 1,000 or less and having the following structural formula (1),

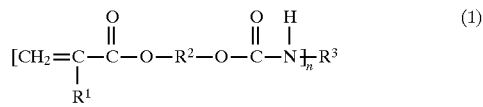

wherein $R^1$ represents a hydrogen atom or a methyl group, $R^2$ represents a divalent hydrocarbon group containing 2–10 carbon atoms, $R^3$ represents an organic group, preferably a hydrocarbon group, with a valence of 2–6 and containing 2–20 carbon atoms, and n denotes an integer of 2–6, provided that when there are two or more groups of $R^1$, $R^2$, or $R^3$ present, a plurality of $R^1$s, $R^2$s, or $R^3$s may be either the same or different, (B) 80–20 wt % of an ethylenically unsaturated monomer containing a cyclic structure and at least one ethylenically unsaturated bond in the molecule and of which the homopolymer has a glass transition temperature of 50° C. or higher;

(C) a photopolymerization initiator;

(D) an inorganic filler having an average particle diameter or an average fiber length of 1–50 $\mu$m, wherein the ratio of the inorganic filler for 100 parts by volume of said monomer components and the photopolymerization initiator is 100–160 parts by volume, and the heat distortion temperature of the cured resin produced from the photo-curable resin composition is 80° C. or higher.

The above second object can be attained in the present invention by a process for preparing a resin-based mold consisting of a plurality of integrally laminated layers of cured resin by repeating (a) a step of providing a layer of the above-mentioned and (b) a step of selectively irradiating said layer of the photo-curable resin composition with light to obtain a cured resin layer, photo-curable resin composition.

DETAILED DESCRIPTION OF THE INVENTION

Figure 1A:
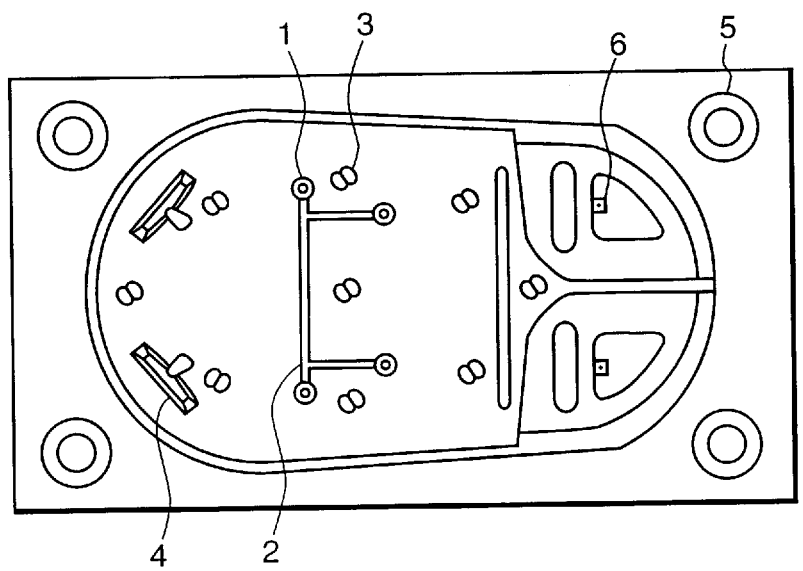
FIG. 1A is a diagram showing a plan view of the resin-based mold prepared in the Example.

The present invention will now be explained in detail.

The photo-curable resin composition of the present invention comprises a monomer component which contains the component (A) and the component (B), a photopolymerization initiator as the component (C), and an inorganic filler as the component (D).

Monomer component

The monomer component which constitutes the photo-curable resin composition of the present invention contains a urethane bond-containing polyfunctional (meth)acrylate which is shown by the above-mentioned formula (1) as the component (A) (hereinafter may be referred to as "specific polyfunctional (meth)acrylate") and an ethylenically unsaturated monomer which possesses a cyclic structure and contains at least one ethylenically unsaturated bond as the component (B) (hereinafter may be referred to as "cyclic structure-containing unsaturated monomer).

The specific polyfunctional (meth)acrylate which is used as the component (A) by an urethanization reaction of at least one polyisocyanate compound selected from a group consisting of diisocyanates, triisocyanates, tetraisocyanates, pentaisocyanates, and hexaisocyanates, and a hydroxyl group-containing (meth)acrylate.

Given as preferred examples of bifunctional polyisocyanates (diisocyanates) used for producing the specific polyfunctional (meth)acrylates are 2,4-tolylene diisocyanate, 2,6-tolylene diisocyanate, 1,3-xylylene diisocyanate, 1,4-xylylene diisocyanate, 1,5-naphthalene diisocyanate, p-phenylene diisocyanate, 3,3'-dimethyl-4,4'-diphenylmethane diisocyanate, 4,4'-biphenylene diisocyanate, hexamethylene diisocyanate, isophorone diisocyanate, dicyclohexylmathane diisocyanate, methylenebis(4-cyclohexylisocyanate), hydrogenated diphenylmethane diisocyanate, 2,2,4-trimethylhexamethylene diisocyanate, bis(2-isocyanatethyl) fumarate, 6-isopropyl-1,3-phenyl diisocyanate, 4-diphenylpropane diisocyanate, lysine diisocyanate and the like can be given. Among these diisocyanate, 2,4-tolylene diisocyanate, 2,6-tolylene diisocyanate, isophorone diisocyanate, hydrogenated diphenylmethane diisocyanate are particularly preferred.

Given as preferred examples of tri- or higher functional polyisocyanate compounds used for producing the specific polyfunctional (meth)acrylates are polymethylene polyphenyl isocyanate, triphenylmethane 4,4',4"-triisocyanate, and the like.

Given as preferred examples of hydroxyl group-containing (meth)acrylates used for producing the specific polyfunctional (meth)acrylates are 2-hydroxyethyl (meth)acrylate, hydroxypropyl (meth)acrylate, 2-hydroxybutyl (meth)acrylate, 4-hydroxybutyl (meth)acrylate, hydroxyoctyl (meth)acrylate, pentaerythritolmonohydroxy tri(meth)acrylate, glycerol di(meth)acrylate, dipentaerythritolmonohydroxy penta(meth)acrylate, 2-hydroxycyclohexyl (meth)acrylate, 4-hydroxycyclohexyl (meth)acrylate, trimethylolpropane di(meth)acrylate, and trimethylolethane di(meth)acrylate. A compound which is obtained by the addition reaction of a glycidyl group-containing compound, such as alkyl glycidyl ether, allyl glycidyl ether, or glycidyl acrylate, and (meth)acrylic acid can also be used. Among these, preferred compounds are 2-hydroxyethyl acrylate, hydroxypropyl (meth)acrylate, 2-hydroxybutyl (meth)acrylate, 4-hydroxybutyl (meth)acrylate, 2-hydroxy-3-phenoxypropyl (meth)acrylate, pentaerythritol monohydroxy tri(meth)acrylate, dipentaerythritol monohydroxy penta(meth)acrylate, trimethylolpropane di(meth)acrylate, and the like.

The specific polyfunctional (meth)acrylates obtained from these polyisocyanate compounds and hydroxy group-containing (meth)acrylates may be used as the component (A) either individually or in combinations of two or more. When two or more of these compounds are used together as the component (A), these two or more compounds may be selected from the specific polyfunctional (meth)acrylates (di(meth)acrylate, tri(meth)acrylate, tetra(meth)acrylate, penta(meth)acrylate or hexa(meth)acrylate) having the same or different valence for organic group $R^3$ in the above-mentioned general formula (1).

The following general formula (2) shows a chemical structure for the specific polyfunctional (meth)acrylate (di (meth)acrylate) which is synthesized using a diisocyanate compound as the polyisocyanate compound.

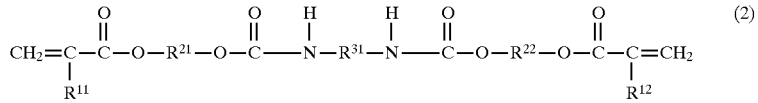

wherein $R^{11}$ and $R^{12}$ represent individually a hydrogen atom or a methyl group, $R^{21}$ and $R^{22}$ represent individually a divalent hydrocarbon group containing 2–10 carbon atoms, and $R^{31}$ represents an organic group, preferably a hydrocarbon group, with a valence of 2–6 and containing 2–20 carbon atoms.

The number average molecular weight of the component (A) is 1,000 or less, and is preferably 800 or less. When the component (A) includes two or more kinds of specific polyfunctional (meth)acrylates, the number average molecular weight for the component (A) is the average of the number average molecular weight of all components constituting the component (A). Therefore, a compound having a number average molecular weight of 1,000 or more may be included in a plurality of specific polyfunctional (meth) acrylates which constitute the component (A). The component (A) which satisfies the defined number average molecular weight may be obtained by suitably selecting the types of the polyisocyanate compound and hydroxyl group-containing (meth)acrylate. The component (A) possessing the number average molecular weight of 1,000 or less can produce cured products (three-dimensional object) with high mechanical strength and heat resistance.

The proportion of the component (A) in the monomer component is 20–80 wt %, preferably 25–70 wt %, and more preferably 30–60 wt %. If the proportion of the component (A) less than 20 wt %, the toughness of the resulting cured products (three-dimensional object) is insufficient. The cured products are fragile, easily broken, and tend to be deformed over time. On the other hand, when the proportion of the component (A) is more than 80 wt %, the viscosity of the resulting photo-curable resin composition is too high.

The unsaturated monomer containing a cyclic structure which is used as the component (B) is a mono-functional or poly-functional monomer possessing a cyclic structure and at least one ethylenically unsaturated bond. The glass transition temperature Tg of the homopolymer which is obtained by the polymerization of this monomer is 50° C. or higher. Use of a monomer capable of producing a homopolymer with a glass transition temperature Tg of of 50° C. or higher ensures high heat resistance, particularly a high heat distortion temperature, of the resulting cured products (three-dimensional object). Preferably, the homopolymer has a glass transition temperature greater than 80° C.

The following compounds can be given as specific examples of such unsaturated monomers containing a cyclic structure: (meth)acryloyl morpholine, morpholinoethyl (meth)acrylate, isobornyl (meth)acrylate, N-vinyl caprolactam, N-vinyl pyrrolidone, tricyclo[5.2.1.0$^{2,6}$] decanyl (meth)acrylate, dicyclopentenyl (meth)acrylate, (meth)acryl-hydrogenated naphthol, o-phenylphenol glycidyl ether (meth)acrylate, p-phenylphenol (meth)acrylate, (meth)acrylated cyclohexene oxide, 2-(meth) acryloyloxyethyl hydrogenphthalate, 2-(meth) acryloyloxypropyl hydrogenphthalate, 2-(meth) acryloyloxypropylhexahydro hydrogenphthalate, tricyclodecanediyldimethylene di(meth)acrylate, tris(2-hydroxyethyl)isocyanurate di(meth)acrylate, tris(2-hydroxyethyl)isocyanurate tri(meth)acrylate, caprolactone modified tris(2-hydroxyethyl)isocyanurate tri(meth) acrylate, bisphenol A di(meth)acrylate, EO modified bisphenol A di(meth)acrylate, PPO modified bisphenol A di(meth) acrylate, bisphenol F di(meth)acrylate, EO modified bisphenol F di(meth)acrylate, PPO modified bisphenol F di(meth)acrylate, bisphenol S di(meth)acrylate, EO modified bisphenol S di(meth)acrylate, PPO modified bisphenol S di(meth)acrylate, hydrogenated bisphenol A di(meth) acrylate, EO modified hydrogenated bisphenol A di(meth) acrylate, EO modified brominated bisphenol A di(meth) acrylate, PPO modified brominated bisphenol A di(meth) acrylate, PPO modified hydrogenated bisphenol A diacrylate, hydrogenated bisphenol F di(meth)acrylate, EO modified hydrogenated bisphenol F di(meth)acrylate, PPO modified hydrogenated bisphenol F di(meth)acrylate, hydrogenated bisphenol S di(meth)acrylate, EO modified hydrogenated bisphenol S di(meth)acrylate, PPO modified hydrogenated bisphenol S di(meth)acrylate, bisphenol A diglycidyl ether di(meth)acrylate, bisphenol F diglycidyl ether di(meth)acrylate, bisphenol S diglycidyl ether di(meth) acrylate, hydrogenated bisphenol A diglycidyl ether di(meth)acrylate, hydrogenated bisphenol F diglycidyl ether di(meth)acrylate, hydrogenated bisphenol S diglycidyl ether di(meth)acrylate, (meth)acrylate of phenolnovolak polyethylene glycidyl ether, 1,3-di(meth)acrylamide methyl-2-imidazolydone, carboepoxy (meth)acrylate, trimethylolpropane (meth)acrylic acid benzoate, allylated cyclohexyl di(meth)acrylate, methoxylated cyclohexyl di(meth) acrylate, epichlorohydrin modified phthalic acid di(meth) acrylate, aromatic polyester (meth)acrylate, and alicyclic polyester acrylate. These compounds may be used either individually or in combinations of two or more.

Among these, (meth)acryloyl morpholine, isobornyl (meth)acrylate, N-vinyl caprolactam, N-vinyl pyrrolidone, tricyclo[5.2.1.0$^{2,6}$]decanyl (meth)acrylate, dicyclopentenyl (meth)acrylate, and tricyclodecanediyldimethylene di(meth) acrylate are preferred.

The proportion of the component (B) in the monomer component is 20–80 wt %, preferably 30–70 wt %, and particularly preferably 35–60 wt %. If this proportion of the component (B) is less than 20 wt %, the curing shrinkage rate of the photo-curable resin composition is significant. In addition, there is a tendency for the mechanical properties and heat resistance of the cured products to be impaired. On the other hand, if the proportion of the component (B) exceeds 80 wt %, there are cases where the photo-curable resin composition can be cured only with difficulty.

Photopolymerization initiators

There are no specific limitations to the photopolymerization initiator used as the component (C) inasmuch as this component is decomposed and produces a radical or a cation on irradiation with light which initiate polymerization of the above-mentioned monomer components.

The following compounds are given as specific examples of such photopolymerization initiators: acetophenone, anthraquinone, 1-(4-isopropylphenyl)-2-hydroxy-2-methylpropan-1-one, carbazole, xanthone, 4-chlorobenzophenone, 4,4'-diaminobenzophenone, 1,1-dimethoxydeoxybenzoin, benzyl methyl ketal, 3,3'-dimethyl-4-methoxybenzophenone, thioxanethone compounds, 1-(4-dodecylphenyl)-2-hydroxy-2-methylpropan-1-one, 2-methyl-1-[4-(methylthio)phenyl]-2-morpholinopropan-1-one, triphenylamine, 2,4,6-trimethylbenzoyl diphenylphosphine oxides, bis-(2,6-dimethoxybenzoyl)-2,4,4-trimethylpentyl phosphine oxides, 1-hydroxycyclohexylphenyl ketone, 2-hydroxy-2-methyl-1-phenylpropan-1-one, fluorenone, fluorene, benzoin, benzoin methyl ether, benzoin ethyl ether, benzoin propyl ether, benzoin isobutyl ether, benzoin benzoic acids, benzophenone, chloroacetophenones such as 4-phenoxy dichloroacetophenone, 2-benzyl-2-dimethylamino-1-(4-morpholinophenyl)-butan-1-one, 3-methylacetophenone, 3,3',4,4'-tetra(t-butylperoxycarbonyl)benzophenone (BTTB), and combinations of BTTB and xanthene, thioxanthene, cumarin, ketocumarin, or other coloring substance sensitizers.

Among these, particularly preferred are 1-hydroxycyclohexyl phenyl ketone, 2,4,6-trimethylbenzoyl diphenylphosphine oxides, 2-methyl-1-[4-(methylthio) phenyl]-2-morpholinopropan-1-one, bis-(2,6-dimethoxy-benzoyl)-2,4,4-trimethylpentyl phosphine oxides, 2-hydroxy-2-methyl-1-phenylpropan-1-one, benzyl methyl ketal, and 2-benzyl-2-dimethylamino-1-(4-morpholinophenyl)-butan-1-one. These compounds can be used either individually or in combinations of two or more.

The component (C) is incorporated in the photo-curable resin composition of the present invention in the proportion of 0.01–10 parts by weight, preferably 1–8 parts by weight, and particularly preferably 2–5 parts, for 100 parts by weight of the total of the component (A) and component (B) which are the monomer components. If this proportion is less than 0.01 part by weight, the curing rate of the photo-curable resin composition may be decreased; if more than 10 parts by weight, on the other hand, there may be adverse effects exhibited on the curing characteristics of and the properties of the resulting three-dimensional objects, and handling of the photo-curable resin composition.

Inorganic fillers

The inorganic fillers used as the component (D) may be particle inorganic fillers or fiber inorganic fillers having an average particle diameter or an average fiber length of 1–50 μm. There are no specific limitations to the inorganic fillers so long as these conditions are satisfied.

Given as specific examples of such inorganic fillers are glass powder, silica powder, alumina, alumina hydrate, magnesium oxide, magnesium hydroxide, barium sulfate, calcium sulfate, calcium carbonate, magnesium carbonate, silicate mineral, diatomaceous earth, silica sand, silica powder, titanium oxide, aluminum powder, bronze powder, zinc powder, copper powder, lead powder, gold powder, silver dust, glass fiber, titanic acid potassium whisker, carbon whisker, sapphire whisker, beryllia whisker, boron carbide whisker, silicon carbide whisker, silicon nitride whisker, glass beads, hollow glass beads, and potassium titanate whisker.

These inorganic fillers may be used either individually or in combinations of two or more.

Given as examples of commercially available products of the inorganic fillers are the products available under the trademarks of glass beads GB210, GB210A, GB210B, GB210C, GB045Z, GB045ZA, GB045ZB, GB045ZC, GB731, GB731A, GB731B, GB731C, GB731M, GB301S, EGB210, EGB210A, EGB210B, EGB210C, EGB045Z, EGB045ZA, EGB045ZB, EGB045ZC, MB-10, MB-20, EMB-10, EMB-20, HSC-070Q, HSC-024X, HSC-080S, HSC-070G, HSC-075L, HSC-110, HSC-110A, HSC-110B, HSC-110C (manufactured by Toshiba Balotini), Radiolite #100, Radiolite Fine Flow B, Radiolite Fine Flow A, Radiolite Sparkle Flow, Radiolite Special Flow, Radiolite #300, Radiolite #200, Radiolite Clearing Flow, Radiolite #500, Radiolite #600, Radiolite #2000, Radiolite #700, Radiolite #500S, Radiolite #800, Radiolite #900, Radiolite #800S, Radiolite #3000, Radiolite Ace, Radiolite Super Ace, Radiolite High-Ace, Radiolite PC-1, Radiolite Deluxe P-5, Radiolite Deluxe W-50, Radiolite Micro Fine, Radiolite F, Radiolite SPF, Radiolite GC, Topco #31, Topco #34, Topco #36, Topco #38, Topco #54 (manufactured by Showa Chemical Industry, Co., Ltd.), Higilite H-X, Higilite H-21, Higilite H-31, Higilite H-32, Higilite H-42, Higilite H-42M, Higilite H-43, Higilite H-32ST, Higilite H-42STV, Higilite H-42T, Higilite H-34, Higilite H-34HL, Higilite H-32I, Higilite H-42I, Higilite H-42S, Higilite H-210, Higilite H-310, Higilite H-320, Higilite H-141, Higilite H-241, Higilite H-341, Higilite H-320I, Higilite H-320ST, Higilite AL-45-HS-310, Higilite HS-320, Higilite HS-341, Alumina A-42-6, Alumina A-42-1, Alumina A-42-2, Alumina A-42-3, Alumina A-420, Alumina A-43-M, Alumina A-43-L, Alumina A-50-K, Alumina A-50-N, Alumina A-50-F, Alumina AL-45-H, Alumina AL-45-1, Alumina AL-43-M, Alumina AL-43-L, Alumina AL-43PC, Alumina AL-150SG, Alumina AL-170, Alumina A-172, Alumina A-173, Alumina AS-10, Alumina AS-20, Alumina AS-30, Alumina AS-40, Alumina AS-50 (manufactured by Showa Denko Co., Ltd.), Starmague U, Starmague M, Starmague L, Starmague P, Starmague C, Starmague CX, High-Purity Magnesia HP-10, High-Purity Magnesia HP-10N, High-Purity Magnesia HP-30, Star Brand-200, Star Brand-10, Star Brand-10A, Star Brand magnesium carbonate, Gold Star, Star Brand magnesium carbonate Two Stars, Star Brand magnesium carbonate One Star, Star Brand magnesium carbonate S, Star Brand magnesium carbonate for feeding, Star Brand magnesium carbonate Heavy, High-Purity magnesium carbonate GP-10, High-Purity magnesium carbonate 30, Star Brand light calcium carbonate for general use, Star Brand light calcium carbonate EC, Star Brand light calcium carbonate KFW-200 (manufactured by Konoshima Chemicals Industry Co., Ltd.), MKC silica GS50Z, MKC silica SS-15 (manufactured by Mitsubishi Chemical Co., Ltd.), Admafine SO-E3, Admafine SO-C3, Admafine AO-800, Admafine AO-809, Admafine AO-500, Admafine AO-509 (manufactured by Admatechs Co., Ltd.), M. S. GELD-5-60A, L-M. S. GEL D-5-120A, M. S. GEL D-5-300A, M. S. GEL D-20-60A, M. S. GEL D-20-120A, M. S. GEL D-20-300A, SILDEX H-31, SILDEX H-32, SILDEX H-51, SILDEX H-52, SILDEX H-121, SILDEX H-122, SILDEX, SILDEX L-51, SILDEX L-121, SILDEX F-51, SILDEX F-121 (manufactured by Asahi Glass Co., Ltd.), SYLYSIA 250, SYLYSIA 250N, SYLYSIA 256, SYLYSIA 256N, SYLYSIA 310, SYLYSIA 320, SYLYSIA 350, SYLYSIA 358, SYLYSIA 430, SYLYSIA 431, SYLYSIA 440, SYLYSIA 450, SYLYSIA 470, SYLYSIA 435, SYLYSIA 445, SYLYSIA 436, SYLYSIA 446, SYLYSIA 456, SYLYSIA 530, SYLYSIA 540, SYLYSIA 550, SYLYSIA 730, SYLYSIA 740, SYLYSIA 770, SYLOPHOBIC100, SYLOPHOBIC 200 (manufactured by Fuji Silysia Chemical Co., Ltd.), NipsilSS-10, Nipsil SS-15, Nipsil SS-10A, NipsilSS-20, Nipsil SS-30P, Nipsil SS-30S, Nipsil SS-40, Nipsil SS-50, Nipsil SS-50A, Nipsil SS-70, Nipsil SS-100, NipsilSS-10F, Nipsil SS-50F, Nipsil SS-50B, Nipsil SS-50C, Nipsil SS-72F, Nipsil SS-170X, Nipsil SS-178B, Nipsil E-150K, Nipsil E-150J, Nipsil E-1030, Nipsil ST-4, Nipsil E-170, Nipsil E-200, NipsilE-220, Nipsil E-200A, Nipsil E-1009, Nipsil E-220A, Nipsil E-1011, NipsilE-K300, Nipsil HD, Nipsil HD-2, Nipsil N-300A, Nipsil L-250, Nipsil G-300, NipsilE-75, Nipsil E-743, Nipsil E-74P (manufactured by Nippon Silica Industry Co., Ltd.), and Tismo-D, Tismo-L, Tofcar Y, Tofcar YN, Tofcar YB, Dendol WK-200, Dendol WK-200B, Dendol WK-300, Dendol BK-200, Dendol BK-300, Swanite, Burrihigh B Super-Dendol (manufactured by Otsuka Chemical Co., Ltd.).

Inorganic fillers of which the surfaces are treated with a silane coupling agent can also be used. Given as examples of the silane coupling agent which can be used as the surface treating agent of the inorganic fillers are vinyl triclorosilane, vinyl tris(β-methoxyethoxy)silane, vinyl triethoxysilane, vinyl trimethoxysilane, γ-(methacryloxypropyl) trimethoxysilane, β-(3,4-epoxycyclohexyl)ethyl trimethoxysilane, γ-glycydoxypropyl trimethoxysilane, γ-glycydoxypropylmethyl diethoxysilane, N-β-(aminoethyl)-γ-aminopropyl trimethoxysilane, N-β-(amino ethyl)-γ-aminopropylmethyl dimethoxysilane, γ-aminopropyl triethoxysilane, N-phenyl-γ-aminopropyl trimethoxysilane, γ-mercaptopropyl trimethoxysilane, and γ-chloropropyl trimethoxysilane.

The proportion of the component (D) (inorganic fillers) in the photo-curable resin composition of the present invention is 100–160 parts by volume, preferably 120–155 parts by volume for 100 parts by volume of the total weight of the component (A), the component (B), and the component (C). Here, the "volume of an inorganic filler" is the value (w/d) obtained by dividing the weight (w) of the inorganic filler with the true specific gravity (d) of this organic filler.

When this proportion of the component (D) is less than 100 parts by volume, the storage stability of the resulting photo-curable resin composition is low, causing the inorganic filler to easily float or precipitate. In addition, it is difficult to obtain a three-dimensional object which possesses high hardness and heat resistance. On the other hand, when this proportion of the component (D) exceeds 160 parts by volume, the viscosity of the composition tends to be high and it becomes difficult to obtain a three-dimensional object with high dimensional accuracy.

Other components

In addition to the above-mentioned components (A) to (D), various components may be incorporated into the photo-curable resin composition of the present invention to the extent that the curability of this composition is not adversely affected. Such other components include photosensitizers (polymerization promoters) of amine compounds such as triethanolamine, methyl diethanolamine, triethylamine, diethylamine; and reactive diluents such as a vinyl ether, a vinyl sulfide, a vinyl urethane, or a vinyl urea. Polymers or oligomers, such as epoxy resin, polyamide, polyamideimide, polyurethane, polybutadiene, polyethylene, chloroprene, polyether, polyester, styrene-butadiene-styrene block copolymer, petroleum resin, xylene resin, ketone resin, fluorine-containing oligomer, silicon-containing oligomer, polysulfide oligomer, may also be incorporated.

Other additives which may be incorporated into the photo-curable resin composition of the present invention include polymerization inhibitors such as phenothiazine or 2,6-di-t-butyl-4-methyl phenol, polymerization initiation adjuvants, leveling agents, wettability improvers, surfactants, plasticizers, UV absorbers, silane coupling agents, resin particles, pigments, dyes and the like.

The photo-curable resin composition of the present invention can be manufactured by homogeneously blending the above-mentioned components (A) to (D) and the other optional components which are used as required. It is desirable for the photo-curable resin composition of the present invention to possess a viscosity in the range of 100–100,000 cps, preferably 500–50,000 cps, and more preferably 1,000–30,000 cps, at 25° C.

The cured resin formed by the photo-curing of the photo-curable resin composition preferably has a Young's modulus higher than 500 kg/mm$^2$. Further, the cured resin has a heat distortion temperature of higher than 80° C., preferably higher than 120° C.

Manufacture of three-dimensional objects

The photo-curable resin composition of the present invention prepared in this manner is suitable as a photo-curable material used in optical molding processes. Specifically, a three-dimensional object with a desired shape consisting of integrally laminated cured resin layers can be obtained by repeating the step of forming a cured layer from the photo-curable resin composition of the present invention by selective irradiation by visible light, ultraviolet light, or infrared light.

Illustrating the process for manufacturing such three-dimensional object more specifically, the photo-curable resin composition is supplied to a suitable supporting stage to form a thin layer (1) of the photo-curable resin composition, this thin layer (1) is selectively irradiated with light to produce a cured solid resin layer (1), the photo-curable resin composition is supplied over this cured resin layer (1) to form a second thin layer (2), and this thin layer (2) is selectively irradiated with light to produce a new cured resin layer (2). This step is repeated for a prescribed number of times, with or without changing the pattern subjected to light irradiation, to produce a three-dimensional object consisting of a multiple number of cured resin layers (n) which are integrally laminated.

Various means may be used to selectively irradiate the photo-curable resin composition with light with no specific limitations. Such light irradiation means include, for example, laser beam, a means for irradiating the composition with a convergent light and the like while scanning, using a lens, mirror, or the like, a means irradiating the composition with a non-convergent light through a mask provided with a fixed pattern through which light is transmitted, and a means for irradiating the composition with light via a number of optical fibers bundled in a light conductive member which produces fixed patterns to irradiate the resin composition. In the means using a mask, a mask which electrooptically produces a mask image consisting of a light transmitting area and non-light-transmitting area according to a prescribed pattern by the same theory as that of the liquid crystal display apparatus. Among these means of light irradiation, the means for selectively irradiating the composition with scanning laser light is preferred for molding a three-dimensional object possessing minute parts or requiring high dimensional accuracy.

The three-dimensional object molded in this manner is processed to removed unreacted photo-curable resin composition remaining on the surface and washed, as required. An organic solvent which is represented by an alcohol, such as isopropyl alcohol or ethyl alcohol, or a low viscosity liquid thermosetting resin or photo-curable resin, can be used as the washing agent in this washing step. The use of low viscosity liquid thermosetting resin or photo-curable resin as the washing agent is preferred when a transparent three-dimensional object is manufactured. In this instance, it is desirable that the product be subjected to a post-cure treatment, which may be a treatment with heat or light irradiation, after washing depending on the types of curable resin used as the washing agent. This post-cure treatment is effective not only for curing the resin remaining uncured on the surface of the laminated body, but also for curing the resin composition which remains uncured inside the laminated body. Thus, the post-cure treatment is effective also in the case where the molded three-dimensional object is washed with an organic solvent.

Because the three-dimensional object obtained in this manner has high mechanical strength and excellent heat resistance, this object is suitable as a resin-based mold which is used for various molding methods, such as an injection molding method, press molding method, vacuum molding method, high-pressure molding method, and foaming mold method.

EXAMPLES

The present invention will be explained in more detail by way of examples, which are not intended to be limiting of the present invention. In the examples below, the glass transition temperature Tg of homopolymers of unsaturated monomer containing a cyclic structure was measured by the following method.

Measurement of glass transition temperatures of homopolymers

A homopolymer was prepared by adding 1-hydroxycyclohexylphenyl ketone to the monomer having a cyclic structure in an amount to make the concentration of the 1-hydroxycyclohexylphenyl ketone 3 wt %, and irradiating with ultraviolet light at a dose of 5 J/cm$^2$. The vibron measurement was carried out on this homopolymer and the resulting tan δ peak temperature taken as the glass transition temperature Tg. When film formation was difficult, DSC measurement of the homopolymer was carried out to adopt the resulting secondary transition temperature as the glass transition temperature Tg.

Manufacture of polyfunctional (meth)acrylate

Preparation Example 1

100 g of tricyclodecanediyldimethylene diacrylate, 171.4 g of 2,4-tolylene diisocyanate, 1.56 g of dibutyl tin laurate, and 0.65 g of 2,6-di-t-butyl-4-methyl phenol were placed in a reaction vessel equipped with a stirrer and the mixture was stirred. 114.3 g of 2-hydroxyethyl acrylate was gradually added while cooling the reaction vessel so as to control the temperature of the reaction system at 25° C. or lower. After the addition, the mixture was stirred while maintaining the temperature at 15° to 35° C. to effect the urethanization reaction. After one hour, 114.3 g of 2-hydroxyethyl acrylate was again gradually added while stirring to control the temperature of the reaction system at 50° to 60° C. to continue the urethanization reaction. The reaction was terminated after six hours upon confirmation that the amount of the residual isocyanate group was less than 0.1%. The number average molecular weight of the specific polyfunctional (meth)acrylate which was contained in this reaction product (hereinafter called "polyfunctional acrylate (1)") was 406. The reaction product contained the polyfunctional acrylate (1) and tricyclodecanediyldimethylene diacrylate at a ratio by weight of 40:10.

Preparation Example 2

100 g of tricyclodecanediyldimethylene diacrylate, 195.6 g of isophorone diisocyanate, 1.56 g of dibutyl tin laurate, and 0.65 g of 2,6-di-t-butyl-4-methyl phenol were placed in a reaction vessel equipped with a stirrer and the mixture was stirred. 102.2 g of 2-hydroxyethyl acrylate was gradually added while cooling the reaction vessel so as to control the temperature of the reaction system at 25° C. or lower. After the addition, the mixture was stirred while maintaining the temperature at 15° to 35° C. to effect the urethanization reaction. After one hour, 102.2 g of 2-hydroxyethyl acrylate was again gradually added while stirring to control the temperature of the reaction system at 50° to 60° C. to continue the urethanization reaction. The reaction was terminated after six hours upon confirmation that the amount of the residual isocyanate group was less than 0.2%. The number average molecular weight of the specific polyfunctional (meth)acrylate which was contained in this reaction product (hereinafter called "polyfunctional acrylate (2)") was 454. The reaction product contained the polyfunctional acrylate (2) and tricyclodecanediyldimethylene diacrylate at a ratio by weight of 40:10.

Comparative Preparation Example 1

100 g of isobornyl acrylate, 220.3 g of 2,4-tolylene diisocyanate, 1.000 g of dibutyl tin laurate, and 1.500 g of 2,6-di-t-butyl-4-methyl phenol were placed in a reaction vessel equipped with a stirrer and the mixture was stirred. 146.8 g of 2-hydroxyethyl acrylate was gradually added while cooling the reaction vessel so as to control the temperature of the reaction system at 25° C. or lower. After the addition, the mixture was stirred while maintaining the temperature at 15° to 35° C. to effect the urethanization reaction. After one hour, 632.9 g of polyoxytetramethylene diol (PTG 1000, manufactured by Hodogaya Chemical Co., Ltd. was added while stirring and controlling the temperature of the reaction system at 50° to 60° C. to continue the urethanization reaction. The reaction was terminated after six hours upon confirmation that the amount of the residual isocyanate group was less than 0.1%. The number average molecular weight of the comparative polyfunctional (meth) acrylate which was contained in this reaction product (hereinafter called "polyfunctional acrylate (3)") was 1,580. The reaction product contained the polyfunctional acrylate (3) and isobornyl acrylate at a ratio by weight of 100:10.

Comparative Preparation Example 2

35.3 g of tricyclo[5.2.1.0$^{2,6}$]decanyl acrylate, 35.3 g of N-vinyl pyrrolidone, 171.4 g of 2,4-tolylene diisocyanate, 1.56 g of dibutyl tin laurate, and 0.65 g of 2,6-di-t-butyl-4-methyl phenol were placed in a reaction vessel equipped with a stirrer and the mixture was stirred. 114.3 g of 2-hydroxyethyl acrylate was gradually added while cooling the reaction vessel so as to control the temperature of the reaction system at 25° C. or lower. After the addition, the mixture was stirred while maintaining the temperature at 15° to 35° C. to effect the urethanization reaction. After one hour, 114.3 g of 2-hydroxyethyl acrylate was again gradually added while stirring to control the temperature of the reaction system at 50° to 60° C. to continue the urethanization reaction. The reaction was terminated after six hours upon confirmation that the amount of the residual isocyanate group was less than 0.1%. The number average molecular weight of the comparative polyfunctional (meth)acrylate which was contained in this reaction product (hereinafter called "polyfunctional acrylate (4)") was 406. The reaction product contained the polyfunctional acrylate (4), tricyclo [5.2.1.0$^{2,6}$]decanyl acrylate, and N-vinyl pyrrolidone at a ratio by weight of 170:15:15.

Example 1

50 parts by weight of the reaction product obtained in the Preparation Example 1, which contains the polyfunctional acrylate (1) and the tricyclodecanediyldimethylene diacrylate (the glass transition temperature of homopolymer: 200° C. or higher) at a ratio by weight of 40:10, 25 parts by weight of tricyclo[5.2.1.0$^{2,6}$]decanyl acrylate (the glass transition temperature of homopolymer: 120° C.), 25 parts by weight of N-vinyl pyrrolidone (the glass transition temperature of homopolymer: 170° C.), 1 part by weight of 1-hydroxy phenyl ketone, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC (manufactured by Toshiba Balotini; the average particle diameter: 17 μm, the true specific gravity: 2.5) in an amount of 340 parts by weight (corresponding to 135 parts by volume for 100 parts by volume of the total of the components (A), (B), and (C)). The mixture was stirred in a homogenizer to obtain a homogeneous slurry of the photo-curable resin composition of the present invention. The components and the proportions are shown in Table 1. This photo-curable resin composition was gray in color.

Example 2

43.75 parts by weight of the reaction product obtained in the Preparation Example 1, which contains the polyfunctional acrylate (1) and the tricyclodecanediyldimethylene diacrylate at a ratio by weight of 40:10, 6.25 parts by weight of tricyclodecanediyldimethylene diacrylate, 30 parts by weight of tricyclo[5.2.1.0$^{2,6}$]decanyl acrylate, 20 parts by weight of N-vinyl caprolactam (the glass transition temperature of homopolymer: 100° C.), 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the components (A), (B), and (C)). The mixture was stirred in a homogenizer to obtain a homogeneous slurry of the photo-curable resin composition of the present invention. The components and the proportions are shown in Table 1. This photo-curable resin composition was gray in color.

Example 3

50 parts by weight of the reaction product obtained in the Preparation Example 1, which contains the polyfunctional acrylate (1) and the tricyclodecanediyldimethylene diacrylate at a ratio by weight of 40:10, 25 parts by weight of N-vinyl pyrrolidone, 25 parts by weight of isobornyl acrylate (the glass transition temperature of homopolymer: 94° C.), 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the components (A), (B), and (C)). The mixture was stirred in a homogenizer to obtain a homogeneous slurry of the photo-curable resin composition of the present invention. The components and the proportions are shown in Table 1. This photo-curable resin composition was gray in color.

Example 4

43.75 parts by weight of the reaction product obtained in the Preparation Example 2, which contains the polyfunctional acrylate (2) and the tricyclodecanediyldimethylene diacrylate at a ratio by weight of 40:10, 6.25 parts by weight of tricyclodecanediyldimethylene diacrylate, 20 parts by weight of N-vinyl caprolactum, 30 parts by weight of acryloyl morpholine (the glass transition temperature of homopolymer: 145° C.), 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the components (A), (B), and (C)). The mixture was stirred in a homogenizer to obtain a homogeneous slurry of the photo-curable resin composition of the present invention. The components and the proportions are shown in Table 1. This photo-curable resin composition was gray in color.

Comparative Example 1

44 parts by weight of the reaction product obtained in the Comparative Preparation Example 1, which contains the polyfunctional acrylate (3) and the isobornyl acrylate at a ratio by weight of 100:10, 10 parts by weight of tricyclodecanediyldimethylene diacrylate, 25 parts by weight of N-vinyl pyrrolidone, 21 parts by weight of isobornyl acrylate, 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the polyfunctional acrylate (3), the component (B), and the component (C)). The mixture was stirred in a homogenizer to obtain a homogeneous slurry of a comparative photo-curable resin composition. The components and the proportions of the comparative composition are shown in Table 1. This comparative photo-curable resin composition was gray in color.

Comparative Example 2

50 parts by weight of the reaction product obtained in the Preparation Example 1, which contains the polyfunctional acrylate (1) and the tricyclodecanediyldimethylene diacrylate at a ratio by weight of 40:10, 25 parts by weight of tricyclo[5.2.1.0$^{2,6}$]decanyl acrylate, 25 parts by weight of phenoxyethyl acrylate (the glass transition temperature of homopolymer: −22° C.), 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the component (A), the component (B), and the phenoxyethyl acrylate). The mixture was stirred in a homogenizer to obtain a homogeneous slurry of a comparative photo-curable resin composition. The components and the proportions of the comparative composition are shown in Table 1. This comparative photo-curable resin composition was gray in color.

Comparative Example 3

100 parts by weight of the reaction product obtained in the Comparative Preparation Example 2, which contains the polyfunctional acrylate (4), tricyclo[5.2.1.0$^{2,6}$]decanyl acrylate, and N-vinyl pyrrolidone at a ratio by weight of 170:15:15, 0.25 part by weight of 2-benzyl-21-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 340 parts by weight (corresponding to 136 parts by volume for 100 parts by volume of the total of the components (A), (B), and (C)). The mixture was stirred in a homogenizer to obtain a homogeneous slurry of a comparative photo-curable resin composition. The components and the proportions of the comparative composition are shown in Table 1. This comparative photo-curable resin composition was gray in color.

Comparative Example 4

43.75 parts by weight of the reaction product obtained in the Preparation Example 2, which contains the polyfunctional acrylate (2) and the tricyclodecanediyldimethylene diacrylate at a ratio by weight of 40:10, 6.25 parts by weight of tricyclodecanediyldimethylene diacrylate, 20 parts by weight of N-vinyl caprolactam, 30 parts by weight of acryloyl morpholine, and 0.25 part by weight of 2-benzyl-2-dimethylamino-1-(4-morpholinophenyl)-butan-1-one, and 0.1 part by weight of p-methoxy phenol were charged into a reaction vessel equipped with a stirrer. The mixture was stirred for two hours at 50° C. to obtain a transparent liquid mixture. To the mixture were added glass beads GB045ZC in an amount of 200 parts by weight (corresponding to 80 parts by volume for 100 parts by volume of the total of the components (A), (B), and (C)). The mixture was stirred in a homogenizer to obtain a homogeneous slurry of a comparative photo-curable resin composition. The components and the proportions of the comparative composition are shown in Table 1. This comparative photo-curable resin composition was gray in color.

Evaluation of photo-curable resin compositions

The photo-curable resin compositions prepared in Examples 1–4 and Comparative Examples 1–4 were evaluated by measuring the viscosity of the composition, the Young's modulus of the cured products, and the heat distortion temperature of the cured products. The results are shown in Table 1.

Viscosity

The viscosity at 25° C. was measured using a B-type viscosimeter.

Young's modulus (1) Preparation of test specimens

A coated film with a thickness of 200 μm was prepared by applying a composition to a glass plate using an applicator. The surface of the film was irradiated with ultraviolet radiation at a dose of 0.5 J/cm$^2$ using a conveyer curing apparatus equipped with a metal halide lamp to prepare a half-cured resin film. Next, the half cured resin film was peeled from the glass plate and placed on a releasable paper. The side opposite to that first cured by irradiation was irradiated with ultraviolet radiation at a dose of 0.5 J/cm$^2$ to prepare a completely cured resin film. The cured film was allowed to stand under conditions of 50% RH to produce a test specimen for the measurement of Young's modulus.

(2) Measurement of Young's modulus

The Young's modulus of the test specimen was measured at a temperature 23° C. and 50% RH under the conditions of a drawing rate of 1 mm/min and a bench mark distance of 25 mm.

Heat distortion temperature (1) Preparation of test specimens

A mold for producing test specimens was prepared by fixing a PET film to a glass plate and applying a silicone rubber plate with a thickness of 4 mm and having a 120 mm×11 mm rectangular through-hole over the PET film. Then, (1) a photo-curable resin composition in an amount sufficient to provide a film with a thickness of about 1 mm was poured into the mold, and (2) ultraviolet radiation at a dose of 0.5 J/cm² was implemented using a conveyer curing apparatus equipped with a metal halide lamp to cure the composition. The procedure consisting of (1) and (2) was repeated four times to obtain a cured product in the shape of a rod with a thickness of 4 mm. This rod-shaped cured product was post-cured by applying ultraviolet light over the entire surface thereof at a radiation dose of 10 J/cm². After the post-cure, the product was allowed to stand under conditions of 23° C. and 50% RH for 24 hours to obtain a test specimen for the measurement of the heat distortion temperature.

(2) Measurement

The heat distortion temperature was measured according to JIS K7207 A.

prepared in the Comparative Example 3, which contains more than 80 wt % of the component (A) in the monomer components, exhibited a high viscosity and was thus not suitable as a photo-curable resin composition for optical molding. The composition prepared in the Comparative Example 4 produced cured products with a low heat distortion temperature because of inclusion of too small an amount of the inorganic filler.

Preparation of resin-based molds

Cavity and core were prepared from the photo-curable resin compositions obtained in the Examples 1–4 and the Comparative Examples 1–4 using an optical molding apparatus "Solid Creator JSC-2000" (manufactured by Sony Corporation), shown in FIG. 1, which employs an argon ion laser emitter (wavelength: 351 nm, 364 nm) as the light source for irradiation under the following conditions:

Laser beam intensity on the liquid surface: 40 mW

Scanning rate: 100 cm/second

Thickness of molded cured resin layer: 0.2 mm

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Component A | | | | | | | | |
| Polyfunctional (meth)acrylate (1) | 40 | 35 | 40 | | | 40 | | |
| Polyfunctional (meth)acrylate (2) | | | | 35 | | | | 35 |
| Polyfunctional (meth)acrylate (3) | | | | | 40 | | | |
| Polyfunctional (meth)acrylate (4) | | | | | | | 85 | |
| Component B | | | | | | | | |
| Tricyclo[5.2.1.0$^{2,6}$]decanyl acrylate | 25 | 30 | | | | 25 | 7.5 | |
| Tricyclodecanediyldimethylene diacrylate | | | | | | | | |
| The amount added during preparation | 10 | 8.75 | 10 | 8.75 | | 10 | | 8.75 |
| The amount added in Examples/Comp. Ex. | | | | | | | | |
| N-vinyl pyrrolidone | | 6.25 | | 6.25 | 10 | | | 6.25 |
| N-vinyl caprolactam | 25 | | 25 | | 25 | | 7.5 | |
| Acryloyl morpholine | | 20 | | 20 | | | | 20 |
| Isobornyl acrylate | | | | 30 | | | | 30 |
| The amount added during preparation | | | 25 | | | | | |
| The amount added in Examples/Comp. Ex. | | | | | | | | |
| Phenoxyethyl acrylate | | | | | | 25 | | |
| Component C | | | | | | | | |
| 1-Hydroxycyclohexylphenyl ketone | 1 | | | | | | | |
| 2-Benzyl-2-dimethylamino-1-(4-morpholinophenyl)-butan-1-one | | 0.25 | 0.25 | 0.25 | 0.25 | 0.25 | 0.25 | 0.25 |
| Component D | | | | | | | | |
| Glass beads GB045ZC | 340 | 340 | 340 | 340 | 340 | 340 | 340 | 200 |
| p-Methoxy phenol | 0.1 | 0.1 | 0.1 | 0.1 | 0.1 | 0.1 | 0.1 | 0.1 |
| Test results | | | | | | | | |
| Viscosity of the composition (cps) | 15000 | 12000 | 18000 | 10000 | 3000 | 5000 | 400000 | 3000 |
| Young's modulus of the cured product (kg/mm²) | 700 | 600 | 750 | 650 | 160 | 280 | 700 | 300 |
| heat distortion temp. of the cured product (°C.) | 150 | 145 | 136 | 160 | 40 | 75 | 140 | 100 |

Figure 1B:
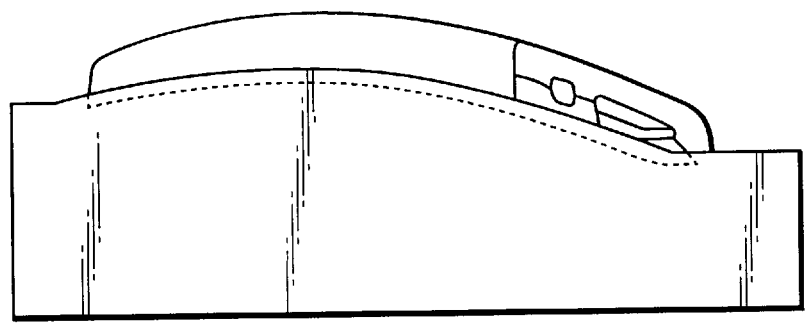
FIG. 1B is a side elevation view of the resin based mold.

As is clear from Table 1, all photo-curable resin compositions of the present invention prepared in the Examples 1–4 had a viscosity suitable for use in the optical molding method and the cured products made therefrom exhibited a high heat distortion temperature. In contrast, the composition prepared in the Comparative Example 1, using the polyfunctional acrylate (3) having a number average molecular weight of more than 1000, and the composition prepared in the Comparative Example 2, using a monomer of which the homopolymer has a low glass transition temperature heat distortion temperature, produced cured products with a low heat distortion temperature. The composition Number of lamination for cavity: 306 times Number of lamination for core: 220 times FIGS. 1A and 1B is a plan view and FIG. 1(II) a side-view of the cavity. In FIG. 1A, 1 denotes a pin form, 2 a rib, 3 a pin form, 4 a nail, 5 a securing screw hole, 6 a pin form.

After removing the resin composition adhering to the surface of the molded cavity and core, the products were subjected to post-curing by irradiation with ultraviolet light at a dose of 20 mW/cm² for 30 minutes and annealed for one hour at 150° C.

Evaluation of resin-based molds

Molding precision of cured products and repetition durability of the resin-based cavity and core were evaluated by injection molding using ABS resin S996-JB Gray manufactured by Japan Synthetic Rubber Co., Ltd. under a mold clamping force of 10 tons, a cylinder temperature of 230° C., a mold temperature of 40° C., an injection rate of 20 mm/second, and the holding pressure of 175 kg/cm².

The results of the evaluation was rated according to the following standard.

Molding precision:
Good: When the dimensional deviation was less than 0.5% of the target molded article.
Bad: When the dimensional deviation was greater than 0.5% of the target molded article.

Repetition durability: The number of times which the resin-based mold could mold the articles without being broken, when continuously used for injection molding.

The results of the evaluation are shown in Table 2.

TABLE 2

|  | Molding precision | Repetition durability |
|---|---|---|
| Example 1 | Good | 70 |
| Example 2 | Good | 58 |
| Example 3 | Good | 55 |
| Example 4 | Good | 60 |
| Comp. Example 1 | Bad | 0 |
| Comp. Example 2 | Bad | 5 |
| Comp. Example 3 | Could not be molded | Could not be molded |
| Comp. Example 4 | Good | 1 |

The photo-curable resin composition of the present invention can produce cured products exhibiting excellent mechanical strength and heat resistance. The composition can therefore be suitably used as the photo-curable material for optical molding methods. In addition, the process for manufacturing a resin-based mold of the present invention can easily produce a resin-based mold which exhibits excellent molding dimensional precision and repetition durability.

This application claims priority based on a Japanese patent application by the same inventors as the instant application, attorney docket number J6607(JSR-T1396), entitled "PHOTO-CURABLE RESIN COMPOSITION AND PROCESS FOR PREPARING RESIN-BASED MOLD" and which was filed in Japan on May 30, 1996, the complete disclosure of which is incorporated herein by reference.

What we claim is:

1. A process for the preparation of a resin-based three-dimensional object comprising the steps of:

forming a first layer of a photo-curable resin composition comprising; as premixture ingredients:

a monomer component comprising, at least one polyfunctional (meth)acrylate monomer represented by the following formula (1):

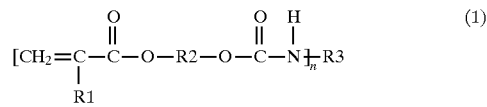

wherein R1 independently represents a hydrogen atom or a methyl group, R2 independently represents a divalent hydrocarbon group comprising 2 to 10 carbon atoms, R3 represents an organic group with a valence of n and comprising 2 to 20 carbon atoms, n represents an integer of from 2 to 6, and at least one ethylenically unsaturated monomer having at least one cyclic structure;

curing select portions of said first layer by radiation to form a first cured layer;

applying a second layer of said photo-curable resin composition, on top of said first cured layer;

curing select portions of said second layer by radiation to form a second cured layer; and repeating said applying and curing steps a plurality of times to produce a resin-based three-dimensional object comprising a plurality of integrally laminated layers of cured resin.

2. A process for the preparation of a resin-based three-dimensional object according to claim 1, further comprising a step of washing said resin-based three-dimensional object with at least one washing agent.

3. A process for the preparation of a resin-based three-dimensional object according to claim 2, wherein said washing agent is at least one agent selected from the group consisting of alcohol, a low viscosity liquid thermosetting resin, and a low viscosity photo-curable resin.

4. A process for the preparation of a resin-based three-dimensional object according to claim 1, further comprising a step of irradiating said resin-based three-dimensional object with heat or light radiation.

5. The process of claim 1, wherein said photo-curable composition further comprises at least one inorganic filler and photopolymerization initiator.

6. The process of claim 5, wherein said at least one inorganic filler is selected from the group consisting of glass beads, hollow glass beads, and potassium titanate whisker.

7. The process of claim 5, wherein said inorganic filler is treated with at least one silane coupling agent.

8. The process of claim 7, wherein said filler is present in a volumetric ratio of from about 1:1 to about 1.6:1 with respect to a combination of said monomer component and said photopolymerization initiator.

9. The process of claim 5, wherein a heat distortion temperature of the cured photo-curable resin composition is at least 80° C.

10. The process of claim 1, wherein said at least one ethylenically unsaturated monomer comprises from about 20 to 80 wt. % of said monomer component.

11. A process for making a three-dimensional object comprising the steps of:

forming and selectively curing a plurality of layers of a photo-curable resin composition comprising; as premixture ingredients:

a monomer component comprising, at least one polyfunctional urethane (meth)acrylate monomer, and at least one ethylenically unsaturated monomer having at least one cyclic structure; and repeating said forming and selectively curing steps a plurality of times to produce a resin-based three-dimensional object comprising a plurality of integrally laminated layers of cured resin.

12. The process of claim 11, wherein said polyfunctional urethane (meth)acrylate monomer is a compound represented by formula (1):

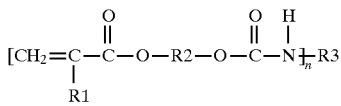

wherein

R1 independently represents a hydrogen atom or a methyl group,

R2 independently represents a divalent hydrocarbon group comprising 2 to 10 carbon atoms, R3 represents an organic group with a valence of n and comprising 2 to 20 carbon atoms, and n represents an integer from 2 to 6.

13. The process of claim 11, wherein said photo-curable composition further comprises at least one inorganic filler.

14. The process of claim 13, wherein said filler has an average particle diameter or an average fiber length of about 1 to about 50 μm.

15. The process of claim 13, wherein said at least one inorganic filler is selected from the group consisting of glass beads, hollow glass beads, and potassium titanate whisker.

16. The process of claim 13, wherein said inorganic filler is treated with at least one silane coupling agent.

17. The process of claim 13, wherein said composition further comprises a photopolymerization initiator.

18. The process of claim 17, wherein said filler is present in a volumetric ratio of from about 1:1 to about 1.6:1 with respect to a combination of said monomer component and said photopolymerization initiator.

19. The process of claim 11 wherein said polyfunctional urethane (meth)acrylate monomer is a product of a reaction between at least one hydroxyl group-containing (meth)acrylate and at least one polyisocyanate compound.

20. The process of claim 19, wherein said polyisocyanate includes at least one compound selected from the group consisting of 2,4-tolylene diisocyanate, 2,6-tolylene diisocyanate, isophorone diisocyanate, and hydrogenated diphenylmethane diisocyanate.

21. The process of claim 19, wherein said polyisocyanate includes at least one compound selected from the group consisting of polymethylene polyphenyl isocyanate and triphenylmethane 4,4',4"-triisocyanate.

22. The process of claim 19 wherein said hydroxyl group-containing (meth)acrylate includes at least one compound selected from the group consisting of 2-hydroxyethyl acrylate, hydroxypropyl (meth)acrylate, 2-hydroxybutyl (meth)acrylate, 4-hydroxybutyl (meth)acrylate, 2-hydroxy-3-phenoxypropyl (meth)acrylate, pentaerythritol monohydroxy tri(meth)acrylate, dipentaerythritol monohydroxy penta(meth)acrylate and trimethylolpropane di(meth)acrylate.

23. The process of claim 11, wherein said at least one ethylenically unsaturated monomer is selected from the group consisting of (meth)acryloyl morpholine, isobornyl (meth)acrylate, N-vinyl caprolactam, N-vinyl pyrrolidone, tricyclo[5.2.1.02,6]decanyl (meth)acrylate, dicyclopentenyl (meth)acrylate, and tricyclodecanediyldimethylene di(meth)acrylate.

24. The process of claim 11, wherein said at least one ethylenically unsaturated monomer comprises from about 20 to 80 wt. % of said monomer component.

* * * * *